June 13, 1967    J. W. KELSO    3,324,562
THREAD GAGE
Filed April 14, 1965    4 Sheets-Sheet 1
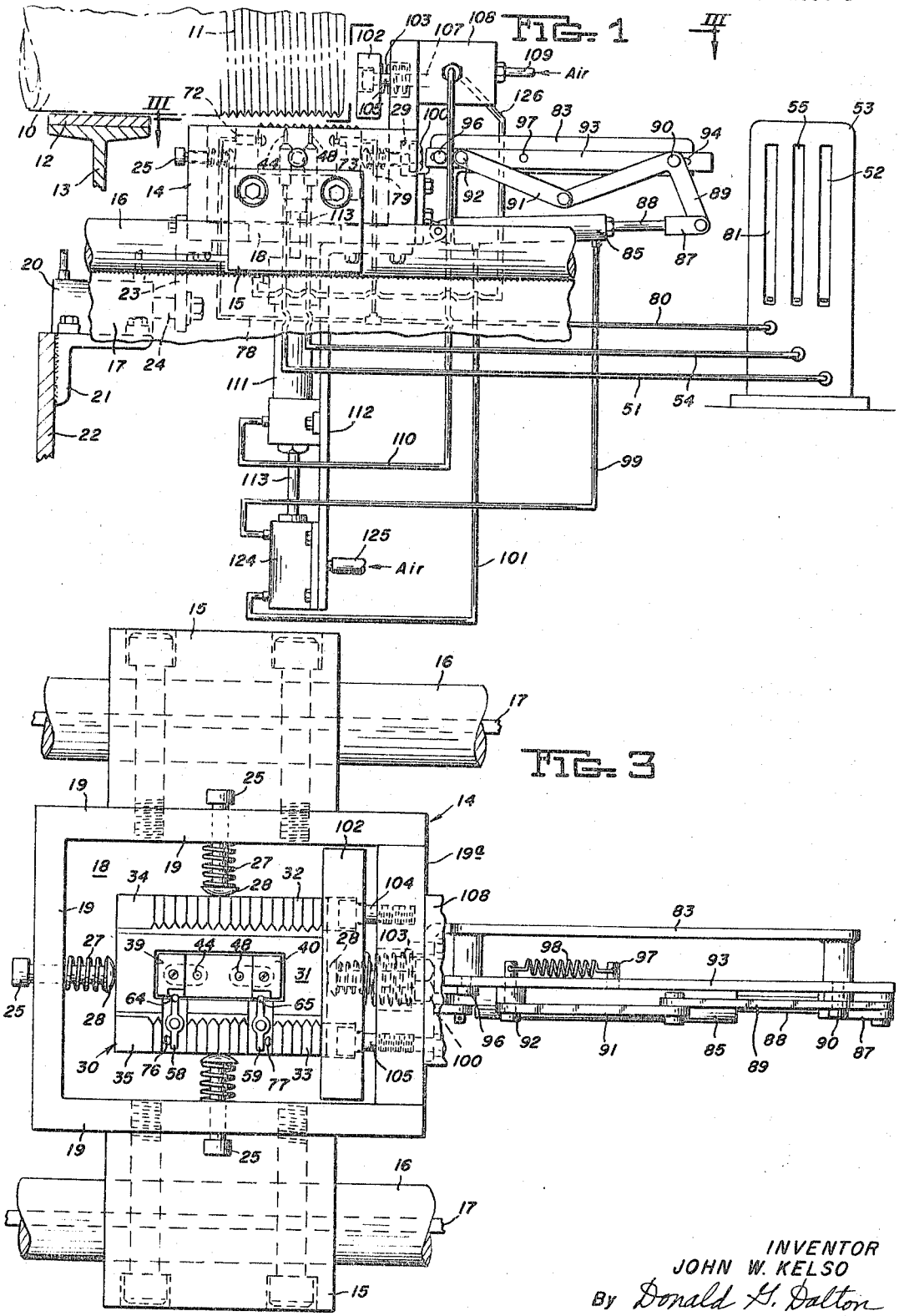
INVENTOR
JOHN W. KELSO
By Donald G. Dalton
Attorney

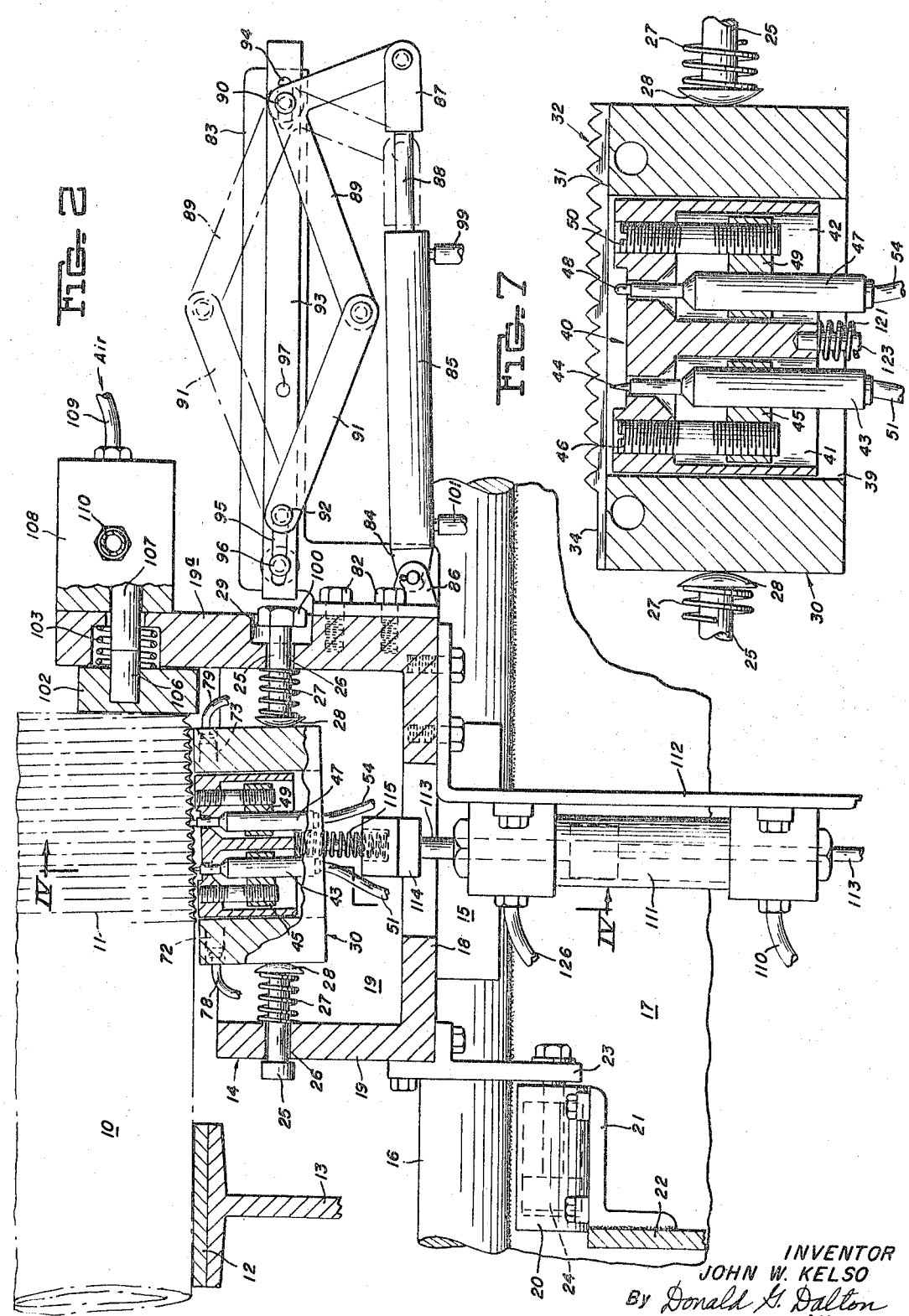

June 13, 1967

J. W. KELSO 3,324,562

THREAD GAGE

Filed April 14, 1965

INVENTOR
JOHN W. KELSO
By Donald G. Dalton
Attorney

June 13, 1967   J. W. KELSO   3,324,562
THREAD GAGE
Filed April 14, 1965   4 Sheets-Sheet 4
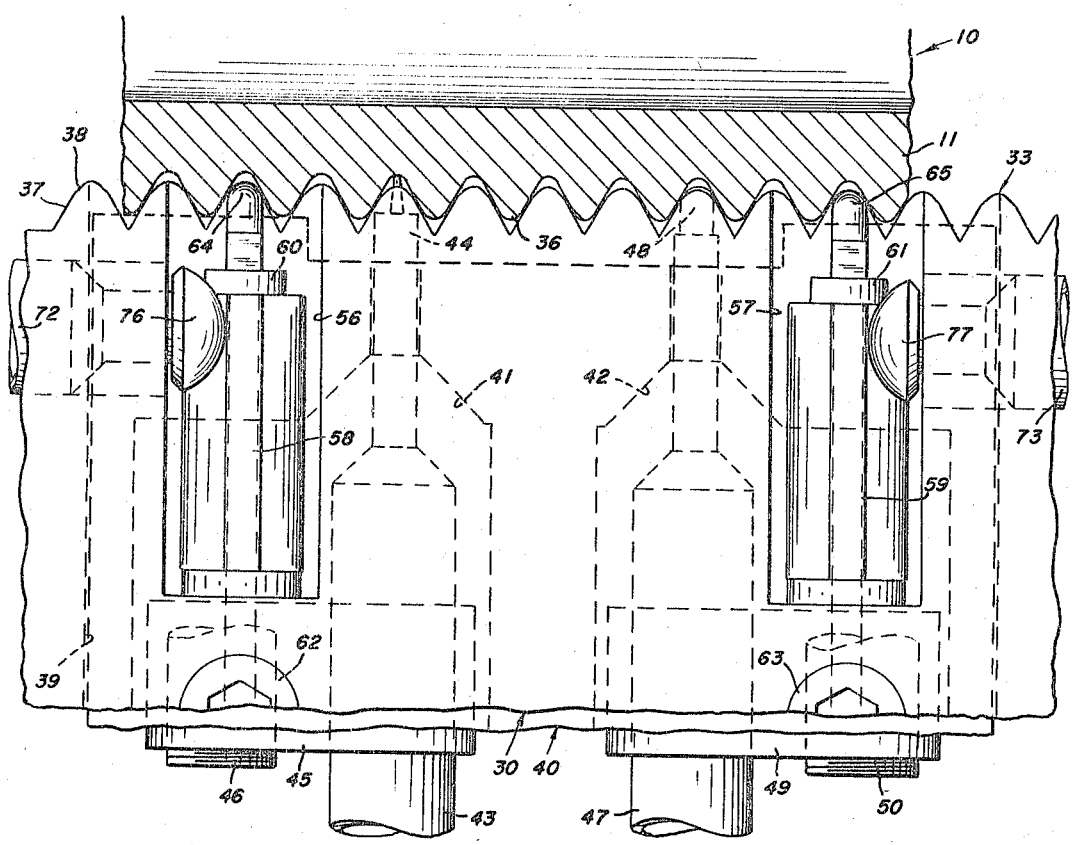
INVENTOR
JOHN W. KELSO
By Donald G. Dalton
Attorney

United States Patent Office 3,324,562
Patented June 13, 1967

---

3,324,562
THREAD GAGE
John W. Kelso, Dravosburg, Pa., assignor to United
States Steel Corporation, a corporation of Delaware
Filed Apr. 14, 1965, Ser. No. 448,040
9 Claims. (Cl. 33—199)

This invention relates to thread-testing apparatus, more particularly, to apparatus for automatically inspecting the threaded portion of a workpiece.

The development of high-speed threading machines has made it necessary to comparably increase the speed of thread inspection. After threading pipe, for example, it is often desirable to inspect each threaded end to assure excellence of the product and to shut down the threading machine quickly when a thread does not meet specifications.

It is an object of the invention to provide thread-testing apparatus for automatically inspecting the elements of any form of external thread on any type of product.

It is a more specific object of invention to provide thread-testing apparatus for inspecting pipe thread elements such as pitch, form, depth and the like.

In a preferred embodiment, I provide thread-testing apparatus comprising a car or carriage adapted to travel longitudinally of the threaded portion of a workpiece. A vertically reciprocable frame supported on the car has a thread-engaging surface thereon. A vertically reciprocable second frame mounted in the first frame has mounted thereon thread-testing styli adapted to inspect the thread for pitch, form and depth. Means are provided for raising and lowering the frames toward and away from respective operative positions relative to the threaded portion. The thread-engaging surface and styli are so mounted with respect to each other that, when said surface engages the threaded portion, the styli are correctly positioned to engage the threaded portion. Means are provided to indicate thread-test results when actuated in proportion to the movement of the respective styli to the point of engaging the threaded portion.

These and other objects, embodiments and advantages of the invention will become apparent from the following detailed descriptions and drawings. In the drawings:

FIGURE 1 is a side elevation of a preferred form of thread-testing apparatus according to the present invention showing its relation to a threaded portion of a pipe length prior to testing;

FIGURE 2 is an enlarged view of a portion of FIGURE 1, in vertical section, showing the relationship of the apparatus to a threaded portion of a pipe length during a test;

FIGURE 3 is an enlarged plan view taken along line III—III of FIGURE 1;

FIGURE 7 is a vertical section taken along line VII—VII of FIGURE 5;

FIGURE 9 is an enlarged side elevation showing the relationship during a test of the thread-testing styli and the perfect threads of a threaded portion of a pipe shown in section.

Figure 4:
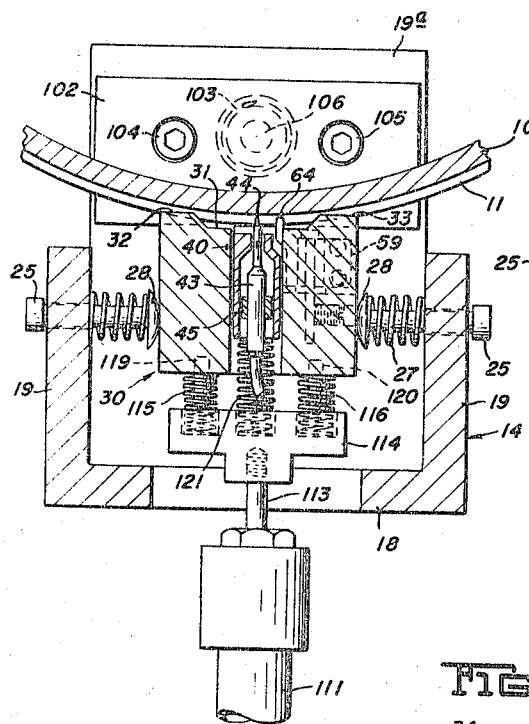
FIGURE 4 is a vertical section taken along line IV—IV of FIGURE 2.

As shown in FIGURES 1–3, a pipe length 10 has a threaded end portion 11. Pipe length 10 is rolled sidewise or laterally into a testing position, stopped and held in position by known transfer means, not shown. Length 10 rolls on a wear plate 12 supported on a beam 13 and is held in a testing position thereon.

The preferred thread-testing apparatus comprises an open-top, generally rectangular car or carriage 14 mounted on a pair of spaced blocks 15, respectively slidable on a pair of spaced ways 16 mounted on a pair of spaced, vertical web plates 17. Car 14 comprises a rectangular base plate 18, shown as integral with and supporting three walls or sides 19 and a fourth wall 18a. A fluid-pressure cylinder 20 is mounted on an angle iron 21, supported on a transverse, vertical plate 22, extending between web plates 17. A bracket 23 attached to car 14 and to a piston 24 of cylinder 20 allows the cylinder to reciprocate the car on ways 16 and thus to travel longitudinally of the threaded portion 11. Fluid-pressure cylinder 20 may be operated manually or by other means, for example, by pipe length 10 actuating a valve or switch, not shown.

Four bolts 25 extend through and are supported respectively in spaced openings 26 in the vertical walls or sides 19 and 19a of car 14. Bolts 25 are resiliently mounted by means of springs 27 extending on the bolts between their button heads 28 and the car walls. For a purpose to be described hereinafter, a car wall 19a has an inwardly extending opening 29 therein, larger than but coaxial with the opening 26.

Reciprocable vertically by means to be described, a generally rectangular frame or block 30 is shown in the figures as being resiliently, frictionally supported by the bolts 25. Frame 30 serves as a primary locator or positioning means for a gage head carrying the individual probes for inspecting the elements of threaded portion 11. Frame 30 may be considered as a solid block which has been machined, as will be described, for particular purposes and to accommodate other elements. As a positioning means, a thread-engaging surface is machined on the upper surface of frame 30. As shown in FIGURES 1–8, more particularly in FIGURES 4–6, a beveled, longitudinal channel 31 is machined across the top surface of frame 30. The channel provides clearance for pipe length 10 between spaced, parallel thread elements 32, 33, cut into said top surface, that serve as thread-engaging surfaces with thread 11 when frame 30 is raised. As shown in FIGURE 2, the resilient support by bolts 25 permits thread elements 32, 33 to accommodate themselves to the taper of thread 11. To assure mating of thread elements 32, 33 with the fully formed threads in threaded portion 11 and to avoid possible interference with the outside of the pipe, thread elements 32, 33 preferably terminate in undercut portions 34, 35 in said top surface. Since the invention may be used with any form of external thread, it is obvious that frame 30 may be modified to omit portions 34, 35.

As shown in FIGURE 9, the threads 36 of threaded portion 11 are standard 60° round top and bottom pipe threads (American Petroleum Institute Standard 5A). The threads 37 of elements 32, 33 are 60°, shaped threads having flanks that mate with the corresponding flanks of threads 36, substantially to the common pitch line of the threads. To avoid possible interference with the roots of threads 36, the remainder of the flanks 38 of threads 37 may be cut at about 45° rather than 60°. The resulting V-crests may be rounded, as shown. Depending on the form of threads 36, the threads 37 may be considered as serrated grooves which are truncated and sharpened modifications of the threads 36 to be measured or tested. The primary purpose of modified threads 37 is to assure uniform positioning of frame 30 with respect to threaded portion 11. A frame 30 with different threads 37 comprising threaded elements 32, 33 may be inserted between resilient bolts 25, as required.

A generally rectangular, vertical opening 39 is cut through frame 30. Reciprocable vertically therein by means to be described, there is provided a generally rectangular second frame or block 40. As shown in FIGURE 7, spaced, upwardly extending recesses 41, 42 are cut in frame 40. In recess 41, a body 43 supports a thread-depth stylus or probe 44. Body 43, mounted in a nut 45, is vertically adjustable in frame 40 by means of a double-thread adjusting screw 46. In recess 42, a body 47 supports a thread-width stylus or probe 48. Body 47 mounted in a nut 49, is vertically adjustable with respect to frame 40 by means of a double-thread adjusting screw 50. As shown in FIGURE 9, stylus 44 has a point at its extremity to measure the root or depth of threads 36 when the thread-engaging surfaces 32, 33 mesh with threaded portion 11. Stylus 48 has a ball-shaped extremity to measure the width of threads 36 at their pitch line.

Styli or probes 44, 48 and the later-described styli for measuring pitch, their respective bodies, auxiliary apparatus and indicating or control gages comprise commercially available systems. Electronic or pneumatic transducers attached to the styli transmit linear-position information through wires or flexible tubes to gages or other means where the information can be observed or automatically evaluated by a suitable alarm when tolerances are exceeded. "Precisionaire" pneumatic systems, manufactured by The Sheffield Corporation, Dayton 1, Ohio, are illustrated in the figures. For example, a body or gaging cartridges 43 comprises a spring-urged plunger or stylus 44 that acts as a precision valve stem to regulate the amount of air flowing through an orifice. Any change in the position of stylus 44 changes the air flow through a conduit or tube 51 and the reading in a column 52 of an air gage 53, as shown in FIGURE 1. Cartridge 47 and its stylus 48 are connected by a conduit 54 to a column 55 of air gage 53.

As shown in FIGURES 5, 6, 8 and 9, spaced, downwardly extending slots or recesses 56, 57 are cut partially through frame 30. The recesses serve for mounting levers 58, 59 journaled on vertical pins 60, 61 secured by set screws 62, 63, respectively. The upper, corner extremities of levers 58, 59 carry ball-shaped styli 64, 65, respectively, to bear against spaced flanks of threaded portion 11 when frame 30 is thrust thereagainst, thereby to measure pitch. Levers 58, 59 are loaded by springs 66, 67, and limited in stroke by set screws 68, 69, respectively. The latter are locked into position by locking set screws 70, 71, respectively. Spring 67 is held in position by set screws 67a. Gaging cartridges 72, 73 held in position in frame 30 by set screws 74, 75, are disposed so their plungers or styli 76, 77 impinge against levers 58, 59, respectively. Levers 58, 59 are preferably positioned by set screws 68, 69 so that styli 64, 65 are separated by a distance slightly greater than the usual one-inch pitch plus the maximum pitch tolerance. Engagement of styli 64, 65 with threaded portion 11 will change this distance to the actual spacing of the specified number of threads per inch. Gaging cartridges 72, 73, as shown in FIGURE 1, are connected by tubes 78, 79 to a common tube 80, connected to a column 81 of air gage 53. Since gaging cartridges 72, 73 are positioned in opposite directions and are connected to a common conduit 80, column 81 will record the distance between styli 64, 65 or the pitch of the threads at their pitch line in threaded portion 11.

To summarize the above explanation, the thread-engaging surfaces 32, 33 of frame 30 are so mounted with respect to styli 44, 48, 64 and 65 that, when surfaces 32, 33 engage threaded portion 11, the respective styli are correctly positioned to engage the required elements of individual threads 36 of threaded portion 11. Gaging cartridges 43, 47, 72 and 73 are actuated in proportion to the movement of their respective styli to the point of engaging the required elements of threads 36. This actuation of the gaging cartridges will indicate a thread-test result on the respective columns 52, 55 and 81 of air gage 53.

In the automatic vertical reciprocation of frame 30, it is possible for the crests of thread-engaging surfaces 32, 33 to engage the crests rather than the roots of threads 36 in threaded portion 11. Hence, the respective styli cannot be properly positioned in the thread elements and inspection thereof cannot take place. As shown in FIGURES 1, 2 and 3, means adjacent thereto are provided for moving frame 30 slightly, preferably in a direction substantially parallel to the axis of pipe length 10. A light thrust is applied to frame 30, thereby moving the crests of surfaces 32, 33 from contact with the crests of threads 36 and permitting proper crest and root engagement of the respective threads.

A pair of spaced screws 82 mount a bracket 83 on wall 19a of car 14. A clevis 84 shown as integral with one end of a fluid-pressure cylinder 85 is pinned to a tang 86, affixed to bracket 83. A clevis 87 mounted on the outer end of piston 88 of cylinder 85 is pinned to one end of a bell crank or elbow lever 89, pivotally mounted on a pin 90, affixed to bracket 83. The opposite extremity of lever 89 is pinned to a link 91, the latter being pinned to a pin 92 at the opposite extremity thereof. A reciprocable bar 93 is mounted at one extremity thereof in a longitudinal slot 94 on pin 90 and at the other extremity in a longitudinal slot 95 on a pin 96, affixed to bracket 83. Pin 92 passes through slot 95. A pin 97 is affixed to bar 93. A spring 98, preferably under tension, is affixed to and between pins 92 and 97.

By means to be described, when fluid pressure is applied to cylinder 85 through a conduit 99, piston 88 is retracted and the linkage 89, 91 moves from its full-line position to its chain-line position. As shown in FIGURE 2, when the linkage moves between these positions, pin 92 reciprocates in slot 95 and the tension on spring 98 increases, then returns to normal tension, thereby first pulling bar 93 to the left, then to the right, thereby sequentially causing bar 93 to strike a glancing blow on an adjustable nut 100 on bolt 25 to reciprocate slightly both bolt 25 and resiliently supported frame 30, thereby moving the crests of surfaces 32, 33 from contact with the crests of threads 36 and permitting proper crest and root engagement of the respective threads.

Figure 6:
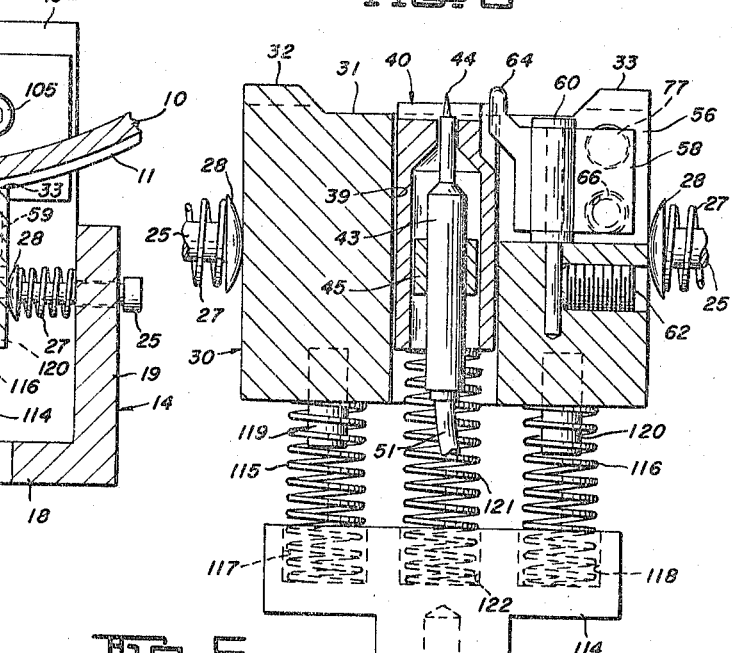
FIGURE 6 is a vertical section taken along line VI—VI of FIGURE 5.
Figure 5:
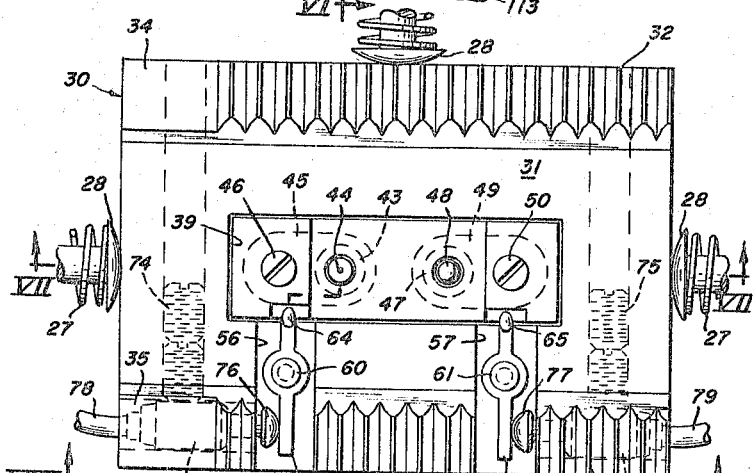
FIGURE 5 is an enlarged plan view of the vertically reciprocable frames and thread-testing styli.
Figure 8:
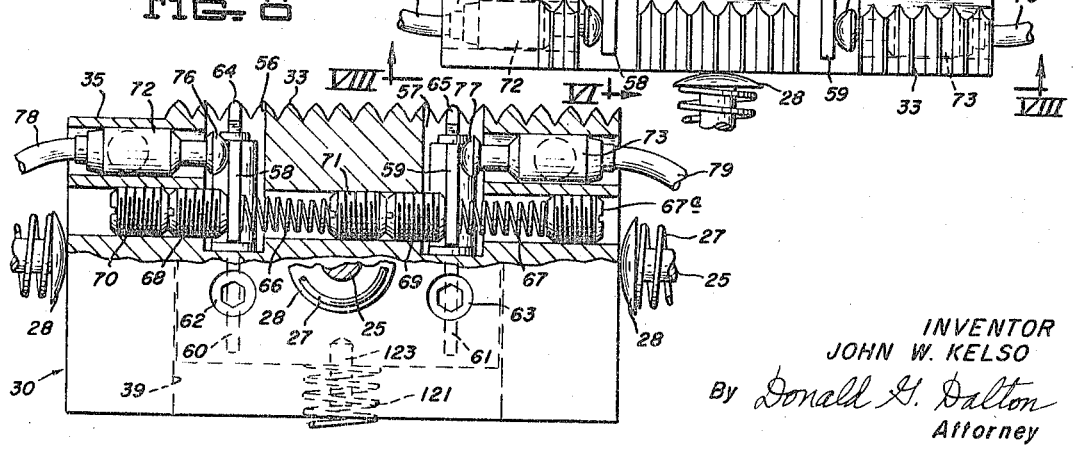
FIGURE 8 is a vertical elevation, partly in section, taken along line VIII—VIII of FIGURE 5.

It is preferred to maintain continuous tension on spring 98 to pull linkage 89, 91 beyond a dead-center position and assure movement from its full-line to its chain-line position. A continuous, sidewise pressure should not be maintained on frame 30 by a dead-center position of linkage 89, 91 or by any other means for moving frame 30 slightly. The resulting axial pressure thereon may bind said respective threads and affect styli measurement adversely. Resilient movement of bar 93 by spring 98 is also preferred since the blow on frame 30 is cushioned in the majority on instances where said respective threads are already in proper engagement. After thread measurement, when said respective threads are disengaged, fluid pressure is applied to cylinder 85 through a conduit 101 and the linkage 89, 91 moves from its chain-line to its full-line position.

cylinder 20 is operated to retract its piston 24, thereby
As shown in the figures, initially in FIGURES 1–3, after a pipe length 10 is positioned for testing, fluid-pressure cylinder 20 is operated to retract its piston 24, thereby moving car 14 longitudinally to the left until the end face of pipe length 10 retracts a yoke or pressure plate 102 against a spring 103 from its position in FIGURE 1 to its position in FIGURE 2, where it is held during a thread-testing cycle. Pressure plate 102 is resiliently mounted on spaced screws 104, 105, tapped into car wall 19a. A piston 106 centrally mounted on plate 102 communicates with and is preferably affixed to a piston 107 of a piston-type valve 108 mounted on wall 19a. Retraction of piston 107 allows valve 108 to pass fluid, for example, compressed air, from a source (not shown) in a conduit 109 through a conduit 110 to a fluid-pressure cylinder 111. The latter is mounted on a bracket 112, affixed to the base 18 of car 14. The piston 113 of cylinder 111 is tapped into and supports a yoke 114. As shown in FIGURES 4–6, spaced springs 115, 116 separate yoke 114 and frame 30. Spaced springs 115, 116 are mounted, respectively, in recesses 117, 118 in yoke 114 and on pins 119, 120, pressed into frame 30. A third spring 121 is positioned intermediate springs 115, 116. Spring 121 is somewhat longer than like springs 115, 116, but has a strength less than the combined strengths of springs 115, 116. Spring 121 separates yoke 114 and frame 40, being mounted, respectively, in a recess 122 in yoke 114 and on a pin 123, pressed into frame 40.

The piston 113 of cylinder 111 is preferably of such length that it extends through cylinder 111 and out of each end thereof. As shown in FIGURE 1, the lower portion of piston 113 is preferably affixed to the piston or functions as the piston of a piston-type valve 124 mounted on bracket 112. Reciprocation of piston 113 allows valve 124 to pass fluid, for example, compressed air, from a source (not shown) in a conduit 125, respectively, through conduits 99, 101 to operate pressure cylinder 85, as previously described.

As previously described, when fluid pressure is applied to conduit 110, cylinder 111 raises piston 113, yoke 114 and frame 30 until the thread-engaging surfaces 32, 33 of the latter engage threaded portion 11. Yoke 114 continues to advance vertically, further compressing springs 115, 116 and compressing spring 121 until spring 121 is compressed sufficiently to raise frame 40 and styli 44, 48 to engage threaded portion 11 and to measure or test the elements thereof. When the thread-engaging surfaces 32, 33 of frame 30 engage threaded portion 11, styli 64, 65 mounted on frame 30 measure the pitch of threaded portion 11. When piston 113 of cylinder 111 has raised frame 30 for crest-to-crest or crest-to-root engagement of thread-engaging surfaces 32, 33 and threaded portion 11, piston-type valve 124 applies fluid pressure through conduit 99 to operate cylinder 85, thereby moving frame 30 slightly to effect proper engagement of said threaded surfaces and proper measurement by the respective styli.

The above-described, automatic measuring or testing cycle is initiated when fluid-pressure cylinder 20 is operated to retract its piston 24, thereby moving car 14 longitudinally and moving yoke or pressure plate 102 against the end face of pipe length 10. After testing, pipe length 10 is rolled laterally out of testing position on wear plate 12 by known means. Compressed spring 103 advances pressure plate 102 against the heads of its mounting screws 104, 105, piston 107 advances and allows valve 108 to admit compressed air from conduit 109 through a conduit 126 to operate cylinder 111 and retract piston 113, thereby lowering frames 30, 40 and moving linkage 89, 91 to its full-time position. Cylinder 20 is operated to advance its piston 24, thereby moving car 14 longitudinally to the position shown in FIGURE 1. The apparatus is now ready to test the threaded portion 11 of another pipe length 10, as described hereinabove.

The invention is characterized by several distinct advantages. In the first place, the apparatus and the operation thereof is simple yet capable of accurately measuring the elements of external threads on any type of product. In the second place, the apparatus is capable of automatically testing the entire production of high-speed threading machines.

Although I have disclosed herein the preferred embodiment of my invention, I intend to cover as well any change or modification therein which may be made without departing from the spirit and scope of the invention.

I claim:

1. Thread testing apparatus comprising a carriage adapted to travel longitudinally of a threaded portion of a supported workpiece, a first frame supported on said carriage and reciprocable in a direction toward and away from said threaded portion, said first frame having a pair of opposed spaced thread engaging surfaces thereon for engagement with said threaded portion in an operative position of said first frame, said first frame having a first opening therethrough between said surfaces, a second reciprocable frame, means mounting said second frame in said first opening for movement in said direction with and with respect to said first frame into and out of an operative position, said second frame having a second opening therethrough, a thread testing stylus, means mounting said stylus in said second opening for movement in said direction with and with respect to said frames into and out of an operative position wherein said stylus engages said threaded portion and receives gaging movement therefrom, means for moving said frames and said stylus in said direction into and out of respective operative positions, and means actuated in proportion to said gaging movement of said stylus to indicate a thread-test result.

2. Thread-testing apparatus as defined in claim 1 characterized by spaced, yielding supports on said carriage suspending said first frame therefrom, said supports affording adjusting means to align said thread-engaging surface with said threaded portion.

3. Thread-testing apparatus as defined in claim 2 characterized by actuating means on said carriage adapted to strike a glancing blow on one of said yielding supports and thereby to align and to engage said thread-engaging surfaces with said threaded portion.

4. Thread-testing apparatus as defined in claim 3 characterized by said actuating means being mounted on said carriage adjacent said first frame and comprising a fluid-pressure cylinder and piston, a linkage connecting said piston and a reciprocable bar.

5. Thread-testing apparatus as defined in claim 1 characterized by said means for moving comprising a fluid-pressure cylinder and piston mounted on said carriage, a yoke mounted on said piston, and yielding members separating said yoke and said frames respectively.

6. Thread-testing apparatus as defined in claim 5 characterized by means for reciprocating said carriage toward and away from an operative position relative to said workpiece, a piston-type valve mounted on said carriage controlling said cylinder and a pressure plate yieldingly mounted on the piston of said valve to actuate the valve, the pressure-plate valve cooperating with said workpiece to control said cylinder when said carriage is reciprocated toward and away from an operative position relative to said workpiece.

7. Thread-testing apparatus as defined in claim 6 characterized by a second fluid-pressure cylinder and piston mounted on said carriage adjacent said first frame and a second piston-type valve controlling said second cylinder, said second valve and said first-mentioned cylinder sharing a common piston.

8. Thread-testing apparatus as defined in claim 5 characterized by said yielding members comprising a pair of spaced springs separating said yoke and said first frame, and a third spring of a strength less than the combined strength of said pair separating said yoke and said second frame, said pair of springs affording adjusting means to align said thread-engaging surface with said threaded portion before said third spring is actuated to raise said second frame toward an operative position.

9. Thread-testing apparatus as defined in claim 1 characterized by means for testing the pitch of said threaded portion comprising a pair of levers rotatably mounted on said first frame in spaced relationship, each lever having a thread-testing stylus mounted thereon, said styli engaging said threaded portion, whereby said styli are moved when said surface engages said threaded portion, and means actuated by said levers in proportion to the movement of the styli to the point of engaging said threaded portion, effective to indicate the pitch of threads thereon, said means being positioned to be actuated in opposition to each other and a common means adapted to transmit styli-movement information connecting said means and a thread-pitch indicating means, respectively.

References Cited

UNITED STATES PATENTS

| | | | |
|---|---|---|---|
| 1,447,416 | 3/1923 | Hill | 33—199 |
| 2,419,280 | 4/1947 | Neff | 33 |
| 2,427,924 | 9/1947 | Rose | 33—199 |
| 2,746,159 | 5/1956 | Aller | 33 |

FOREIGN PATENTS 390,920   2/1924   Germany.

LEONARD FORMAN, *Primary Examiner.*

J. M. FREED, *Assistant Examiner.*